3,616,710
MOTION LIMITING DEVICE
John W. Hipelius, Skokie, Ill., assignor to Bell & Howell Company, Chicago, Ill.
Filed Sept. 23, 1969, Ser. No. 860,336
Int. Cl. G05g 5/06
U.S. Cl. 74—527
9 Claims

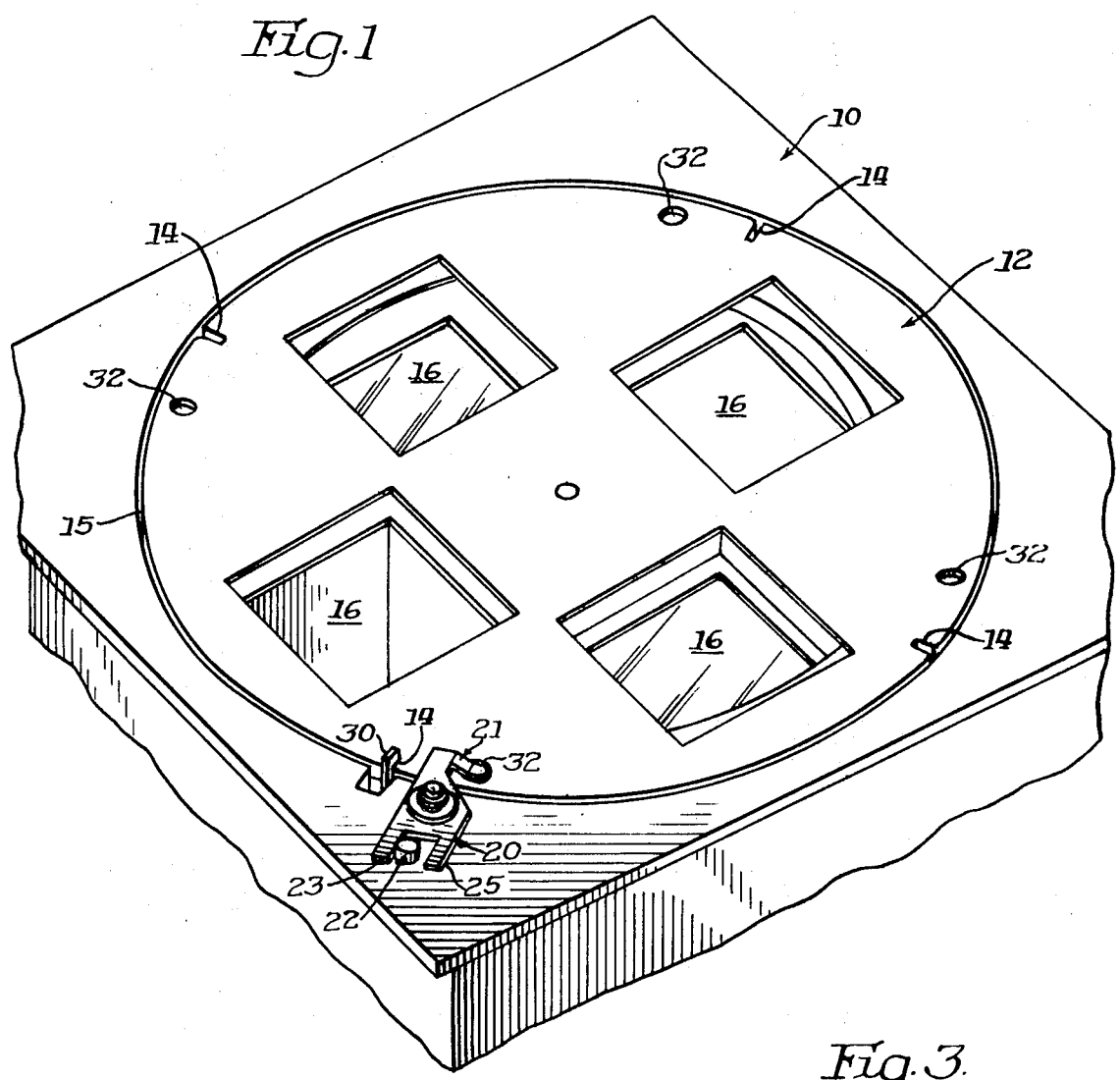
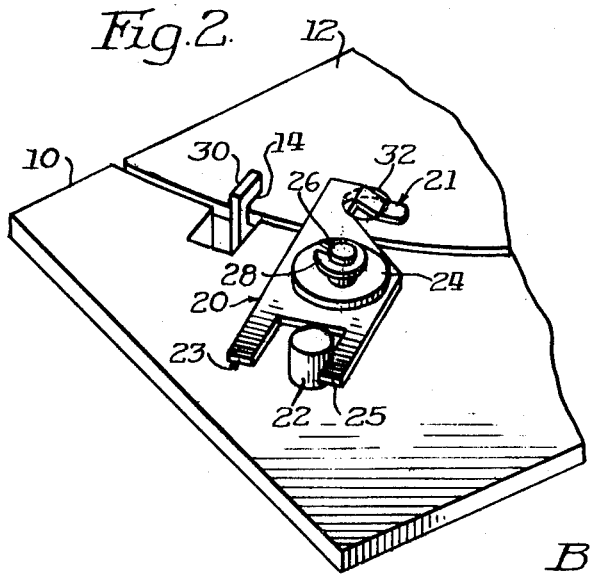
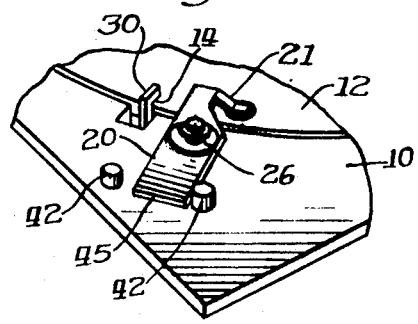

ABSTRACT OF THE DISCLOSURE

A device that permits unlimited uni-directional sequential relative motion between two bodies but limits reverse relative motion to a single sequence.

CROSS-REFERENCE TO RELATED APPLICATIONS

This invention is related to co-pendnig application Ser. Nos. 735,730, filed June 10, 1968; and 860,384, filed Sept. 23, 1969.

BACKGROUND OF THE INVENTION

This invention relates generally to devices for preventing relative motion between two elements.

More specifically, this invention relates to a device that permits unlimited motion in one direction but restricts motion in the opposite direction.

The slide projector described in the previously identified co-pending applications transports photographic slides in a horizontal plane through the projecting apparatus. In one modification, the slides are sequentially indexed through 90° rotations. A feature of that projector is its capability to reverse the normal sequencing direction and re-project the slide last projected. However, the projector must not be able to perform more than one 90° reversal before again sequencing the projector in the normal operating direction.

To accomplish that end this invention was developed.

SUMMARY OF THE INVENTION

A reversal limiting member is mounted rotatably on a stationary platform. The limiting member is rotatable in the same plane as the movement of an associated element which has indentations thereon. When the movement of the associated element is reversed from its normal direction the limiting member falls into an indentation and halts the reverse movement at the desired point.

BRIEF DESCRIPTION OF THE DRAWINGS

The advantages and features of this invention will become apparent in the following description of preferred embodiments and drawings wherein:

FIG. 1 is a perspective view of an apparatus embodying the invention.

FIG. 2 is a perspective view of the invention shown in FIG. 1 in a different operational mode.

FIG. 3 is a perspective view of another embodiment of the invention.

DESCRIPTION OF THE PREFERRED EMBODIMENTS

Referring to FIG. 1, there is seen a drive plate 12 which is mounted rotatably within a housing 10. Four apertures 16 are cut into the drive plate 12 and correspond to the operating stations of the projector. The functions of the operating stations are not necessary to an understanding of this invention but are set out in the above-identified co-pending applications.

In normal operation, the drive plate 12 is sequenced through 90° counter-clockwise rotations. A knife-edge 30, spring biased toward the center of the drive plate 12, falls into one of the four equi-spaced slots 14 to prevent more than 90° of rotation at any one time. Thus to rotate the drive plate 12 with the knife-edge 30 being in a slot 14, as shown in FIG. 1, the knife-edge must first be momentarily withdrawn from the slot and the rotation begun. The knife-edge 30 then rides along the outer edge 15 of the drive plate 12 until it once again is aligned with a slot 14 at which point rotation ceases.

As best seen in FIG. 2, a reverse motion limiting element 20 is mounted rotatably on a pin 26 which projects from the stationary housing 10. A bevelled stopping tip 21 and two arms 23, 25 projecting from the reverse motion limiting element 20 define a somewhat Y-shaped configuration. A conventional washer 24 placed upon the reverse motion limiting element 20 adds weight thereto and an E-ring 28 attached to the post 26 maintains the assembly on the post 26. It is important to note that the E-ring 28 is spaced from the washer 28 such that vertical movement of the reverse motion limiting member 20 and the washer 24 is not impeded. A stop 22 limits the rotation of the reverse motion limiting member 20 to a predetermined arc.

For convenient adjustment of the predetermined arc, the stop 22 may be rotatably mounted to the platform 10. By eccentrically shaping or mounting the stop 22, rotation of the stop 22 will alter the arc through which the limiting element 20 may travel.

Four equi-spaced cylindrical depressions 32 in the drive plate 12 cooperate with the stopping tip 21 to limit sequetnial clockwise rotation of the drive plate 12. The reverse motion limiting member 20 is supported by the ends of the arms 23, 25 and the stopping tip 21. Therefore when the stopping tip 21 overlies a depression 32 it will drop into that depression 32. After the stopping tip 21 has entered a depression 32, clockwise rotation of the drive plate 12 may not proceed further.

FIG. 1 shows the position of the stopping tip 21 within a depression 32 after one 90° clockwise rotation of the drive plate 12. Arm 23 abuts the stop 22 and the stopping tip 21 abuts the right edge of the depression 32. Thus even if the knife-edge 30 were removed from the slot 14, the reverse motion limiting device would prevent further clockwise rotation of the drive plate 12.

Starting from the position in FIG. 1, any number of 90° counter-clockwise rotations of the drive plate 12 changes the position of the reverse motion limiting member 20 to that shown in FIG. 2. To produce this result, the frictional forces acting on stopping tip 21 must be greater than those acting on the arms 23, 25. As the drive plate 12 rotates counter-clockwise from the position shown in FIG. 1, the bevelled portion of the stopping tip 21 allows the stopping tip 21 to rise out of the depression 32, concurrently the reverse motion limiting member 20 rotates clockwise until arm 25 abuts the stop 22 as shown in FIG. 2. At the point depicted in FIG. 2, the knife-edge 30 has been inserted in another slot 14 and the stopping tip 21 has not fallen into a depression 32 but rather rests on the drive plate 12 to the right of the depression 32 because of the clockwise rotation of the limiting element 20.

Because the stopping tip 21 has not entered the depression 32, from the position shown in FIG. 2 clockwise rotation of the drive plate 12 may be effected. A clockwise rotation of the drive plate 12 from the position of FIG. 2 would rotate the reverse motion limiting member 20 counter-clockwise until arm 23 abutted the stop 22; after 90° of rotation the knife-edge 30 would drop into the next slot 14 and the stopping tip 21 would drop into a depression 32. In other words, the apparatus would have once again assumed the positions depicted in FIG. 1. As previously stated, from the FIG. 1 position clockwise rotation of the drive plate 12 may not be effected and therefore the reverse motion limiting member has effectively limited clockwise rotation of the drive plate 12 to a single 90° clockwise rotation. At the same time, because of the bevelled stopping tip 21 counter-clockwise rotation of the drive plate 12 will never be impeded by the reverse motion limiting member 20.

It should be quite apparent that the relationship of the depression 32, the stopping tip 21 and the arc which the stopping tip 21 may traverse must be rather precise. Additionally, in this specialized embodiment, the position of the slots 14 must be precise. Furthermore it should be obvious that many formulations of the geometrical relationships may be utilized to achieve the above described results.

FIG. 3 depicts a second embodiment for limiting the arc about the pin 26 which the stopping tip 21 may traverse. The device is identical with that shown in FIGS. 1 and 2 except a single arm 45 alternates abutting two stops 42 instead of two arms 23, 25 which alternate abuttment with a single stop 22. Either or both of the stops 42, 42 may be rotatably mounted to the platform 10 and eccentrically shaped or mounted to provide adjusting means for altering rotational travel of the limiting element 20.

Furthermore, it should be readily appreciated that this invention has wide applicability and may easily be adapted to perform the same function when the reversal of relative rectilinear motion needs to be limited. Obviously the stopping tip need not be bevelled, as the depressions could easily be bevelled to permit a cylindrical tip, for example, to exit from a depression.

Moreover, the stopping tip need not be mounted rotatably on a stationary platform, but could readily be adapted to be rotatably mounted on a moveable body.

I claim:

1. A device for limiting reversal of predetermined sequential relative motion between two bodies to a single reverse sequence after any forward sequence comprising:
   first and second bodies adapted to be moved relative to one another in forward and reverse directions, said relative motion being predetermined and sequential,
   a stopping tip rotatably mounted on said first body, frictionally engaging said second body such that said relative motion causes rotation of said stopping tip,
   restricting means for limiting rotation of said stopping tip to less than 360°, said stopping tip thereby having positions of maximum forward rotation and maximum reverse rotation;
   engaging means disposed on said second body for engaging said stopping tip to prevent reverse motion, said means disposed such that said stopping tip is engaged at the end of a first reverse sequence when said stopping tip is in its position of maximum reverse rotation whereby said engagement prevents a second consecutive reverse sequence and such that said stopping tip is not engaged by said engaging means after any forward motion sequence when said stopping tip is in its position of maximum forward rotation whereby a reverse sequence may take place after any forward sequence.

2. The device set forth in claim 1 wherein: said stopping tip comprises a portion bevelled in the direction of said forward relative motion and said engaging means comprise depressions in said second body.

3. The device set forth in claim 2 wherein said stopping tip projects from a substantially Y-shaped member and forms the lower portion of said Y.

4. The device set forth in claim 3 wherein said limiting means comprises a post mounted on said first body disposed within the upper V-shaped portion of said Y-shaped member.

5. The device set forth in claim 4 wherein said post is rotatably mounted on said first body.

6. The device set forth in claim 5 wherein said post is eccentrically shaped.

7. The device set forth in claim 5 wherein said post is eccentrically mounted.

8. A device for limiting sequential movement of a rotatable plate to a single reverse sequence after any forward sequence comprising:
   a flat, horizontally oriented, circular plate mounted for rotation about a vertical axis;
   means for sequentially rotating said plate through a predetermined arc in both forward and reverse directions;
   a stationary member in the vicinity of said plate;
   a pin projecting vertically from said stationary member;
   a stopping member including a stopping tip that frictionally engages said plate;
   said stopping member being loosely mounted on said pin to permit both vertical motion of said stopping member along said pin and rotational motion of said stopping member about said pin when said plate is rotated;
   means mounted on said stationary member for limiting reverse rotation of said stopping member;
   at least one recess formed in said plate for engaging said stopping tip and for preventing reverse movement of said plate when said stopping tip is engaged;
   said recess being disposed on said plate such that it does not engage said stopping tip at the end of a forward sequence of said plate and does engage said stopping tip at the end of a reverse sequence of said plate; whereby at the end of said reverse sequence said limiting means, said stopping member and said engaging means coact to prevent a second consecutive reverse sequence.

9. The device set forth in claim 8 wherein said stopping member is substantially Y-shaped and said stopping tip forms the lower portion of said Y.

References Cited

UNITED STATES PATENTS

| | | | |
|---|---|---|---|
| 1,893,343 | 1/1933 | Tyler | 74—529 |
| 2,119,638 | 6/1938 | Klampferer | 74—540 |

FOREIGN PATENTS

| | | | |
|---|---|---|---|
| 44,304 | 4/1908 | Switzerland | 74—527 |

MARTIN P. SCHWADRON, Primary Examiner

R. H. LAZARUS, Assistant Examiner